(12) United States Patent
Park et al.

(10) Patent No.: US 11,421,060 B2
(45) Date of Patent: Aug. 23, 2022

(54) DOPE SOLUTION FOR PREPARING OPTICAL FILM AND OPTICAL FILM USING THE SAME

(71) Applicant: LG MMA CORP., Yeosu-si (KR)

(72) Inventors: Sung Il Park, Daejeon (KR); Seong Jang Jeon, Daejeon (KR); Sang Seok Park, Daejeon (KR); Eun Jin Jeon, Daejeon (KR); Sang Eob Na, Seoul (KR)

(73) Assignee: LG MMA CORP., Yeosu-si (KR)

( * ) Notice: Subject to any disclaimer, the term of this patent is extended or adjusted under 35 U.S.C. 154(b) by 718 days.

(21) Appl. No.: 16/364,305

(22) Filed: Mar. 26, 2019

(65) Prior Publication Data

US 2019/0218322 A1 Jul. 18, 2019

Related U.S. Application Data

(63) Continuation-in-part of application No. PCT/KR2017/010525, filed on Sep. 25, 2017.

(30) Foreign Application Priority Data

Sep. 27, 2016 (KR) .................. 10-2016-0123912
Apr. 24, 2017 (KR) .................. 10-2017-0052336

(51) Int. Cl.

| C08F 220/14 | (2006.01) |
| C08J 3/11 | (2006.01) |
| C08J 5/18 | (2006.01) |
| G02F 1/1335 | (2006.01) |
| G02B 1/14 | (2015.01) |
| C08J 3/205 | (2006.01) |
| B29L 11/00 | (2006.01) |
| B29C 41/02 | (2006.01) |
| B29C 55/02 | (2006.01) |
| B29K 33/00 | (2006.01) |
| B29C 55/12 | (2006.01) |
| B29C 55/04 | (2006.01) |

(52) U.S. Cl.
CPC .............. *C08F 220/14* (2013.01); *C08J 3/11* (2013.01); *C08J 3/205* (2013.01); *C08J 5/18* (2013.01); *G02B 1/14* (2015.01); *G02F 1/133528* (2013.01); *B29C 41/02* (2013.01); *B29C 55/02* (2013.01); *B29C 55/04* (2013.01); *B29C 55/12* (2013.01); *B29K 2033/12* (2013.01); *B29L 2011/0066* (2013.01); *C08F 2800/20* (2013.01); *C08J 2333/12* (2013.01)

(58) Field of Classification Search
CPC ...... C08F 220/14; C08F 2800/20; G02B 1/14; C08J 3/093; C08J 3/11; C08J 3/12; C08J 5/18; C08J 2333/12; G02F 1/133528
USPC .......................................... 359/487.01, 507
See application file for complete search history.

(56) References Cited

U.S. PATENT DOCUMENTS

| 2009/0099308 | A1 | 4/2009 | Takebe et al. |
| 2010/0165263 | A1* | 7/2010 | Lee ............... C08J 5/18 526/172 |
| 2010/0292368 | A1 | 11/2010 | Takebe et al. |
| 2012/0300299 | A1* | 11/2012 | Yasui ........... G02B 1/14 427/299 |
| 2013/0052440 | A1 | 2/2013 | Sakamoto et al. |
| 2013/0280529 | A1* | 10/2013 | Toyama .......... C09J 133/08 428/339 |
| 2014/0085722 | A1* | 3/2014 | Yasui ........... G02B 5/305 359/483.01 |
| 2014/0240647 | A1* | 8/2014 | Huh ............. G02B 5/3033 359/507 |
| 2014/0272200 | A1* | 9/2014 | Akizuki ......... C09J 133/066 428/336 |
| 2015/0062705 | A1* | 3/2015 | Toyama ......... G02F 1/133504 156/332 |
| 2015/0183945 | A1 | 7/2015 | Shiraishi et al. |
| 2015/0293287 | A1* | 10/2015 | Yasui ........... G02B 5/3033 428/354 |
| 2016/0161652 | A1* | 6/2016 | Kitagawa ....... G02B 5/305 156/60 |
| 2016/0185993 | A1* | 6/2016 | Yoshida ........ G02B 5/3033 526/263 |
| 2016/0237230 | A1* | 8/2016 | Sasata .......... C08L 33/12 |
| 2017/0152404 | A1* | 6/2017 | Niimi .......... C09J 133/06 |
| 2017/0247585 | A1* | 8/2017 | Kim ............ C08G 18/6254 |

FOREIGN PATENT DOCUMENTS

| CN | 101925641 A | 12/2010 |
| JP | 2003002907 A | 1/2003 |
| KR | 10-2015-0039089 A | 4/2015 |
| WO | 2007032304 A1 | 3/2007 |
| WO | WO 2010-013539 A1 | 2/2010 |
| WO | 2015098676 A1 | 7/2015 |

(Continued)

OTHER PUBLICATIONS

WIPO, International Search Report dated Jan. 5, 2018 regarding the international patent application No. PCT/KR2017/010525.

*Primary Examiner* — Ricky D Shafer

(74) *Attorney, Agent, or Firm* — Li & Cai Intellectual Property (USA) Office

(57) ABSTRACT

Provided are a dope solution for preparing a polarizing plate protective film by a solution casting method using an acrylic polymer with high thermal resistance and high molecular weight, and a polarizing plate protective film using the same.

The polarizing plate protective film using the dope solution according to the present invention has excellent optical properties, high tensile strength, low hygroscopic properties, and high thermal resistance, and thus, has the effects of excellent dimensional stability, and excellent adhesion with a polyvinyl alcohol film.

16 Claims, No Drawings

(56) References Cited

FOREIGN PATENT DOCUMENTS

WO      2015111519 A1    7/2015
WO      2015147115 A1    10/2015

\* cited by examiner

DOPE SOLUTION FOR PREPARING OPTICAL FILM AND OPTICAL FILM USING THE SAME

TECHNICAL FIELD

The present invention relates to a dope solution for preparing a polarizing plate protective film by a solution casting method using an acrylic polymer with high thermal resistance and high molecular weight, and a polarizing plate protective film using the same.

A polarizing plate protective film using the dope solution according to the present invention has excellent optical properties, high tensile strength, low hygroscopic properties, and high thermal resistance, and thus, excellent dimensional stability due to those properties, and excellent adhesion with a polyvinyl alcohol film.

BACKGROUND ART

With development of optical technology in recent years, thinning, weight reduction and enlargement of a liquid crystal display are required throughout the display industry, and the techniques such as having a wide viewing angle, high contrast and uniformity of screen display, and inhibiting image change due to a viewing angle are emerging as a particularly important issue.

As these display devices, various polymer films such as a polarizing film, a polarizing plate protective film, a phase difference film, a light guiding panel, and a plastic substrate are used, and the required properties of these polymer materials for display are further upgraded.

Since a cellulose ester film has high strength and flame retardancy, it has been used for photographs or as various optical materials. In particular, since a cellulose acylate film has high optical transparency and optical isotropy, it has been widely used as an optical transparent film for a liquid crystal display. For example, in a polarizing plate which is one of the optical films forming a liquid crystal display, a cellulose acylate film which may be directly joined to polyvinyl alcohol (PVA) as a polarizer, in particular, a triacetyl cellulose film has been mainly used as a polarizing plate protective film which is a protective film stacked on both surfaces of a polarizer. In addition, it may be stretched under a suitable condition, thereby being used as an optical compensation film.

However, when this cellulose ester film is molded into a thin film form, it has generally poor moisture permeability so that there occurs a problem in storage stability due to swelling, and in particular, due to decreased durability under a hot and humid environment, functions of a liquid crystal display are greatly influenced negatively. In addition, a decreased film strength and surface hardness problem due to thinning also occurs.

In order to overcome the above problems, studies for preparing an optical film using an acrylic polymer are being conducted. Korean Patent Laid-Open Publication No. 10-2015-0039089 of the present applicant discloses a resin composition for an optical film including an acrylic copolymer and an optical film prepared using the same. The above patent document relates to a resin composition for an optical film for preparing an optical film by a melt extrusion method, however, when the composition is prepared by a solution casting method, film formation is difficult, and peel-off is not easy, thereby causing defects.

RELATED ART DOCUMENT

[Patent Document]
Korean Patent Laid-Open Publication No. 10-2015-0039089 (Apr. 9, 2015)

DISCLOSURE

Technical Problem

An object of the present invention is to provide a polarizing plate protective film having excellent thermal resistance and low moisture permeability under a hot and humid environment, as compared with that conventionally using a cellulose acylate resin.

Another object of the present invention is to provide a dope solution for preparing a polarizing plate protective film by a solvent casting method using an acrylic resin.

Technical Solution

As a result of a study conducted for achieving the above objectives, we found that it is possible to prepare a film by a solvent casting method using an acrylic polymer when the weight average molecular weight and glass transition temperature of the acrylic polymer are within a certain range, thereby completing the present invention.

In one general aspect, a dope solution for preparing a polarizing plate protective film includes an acrylic polymer having a weight average molecular weight of 400,000 g/mol or more and a glass transition temperature of 110° C. or more, and an organic solvent.

In another general aspect, a polarizing plate protective film prepared by a solvent casting method using the dope solution has a weight average molecular weight of 400,000 g/mol or more and a glass transition temperature of 110° C. or more.

In another general aspect, a polarizing plate includes a polarizer and the polarizing plate protective film disposed on at least one surface of the polarizer.

In another general aspect, a method of preparing a polarizing plate protective film includes: a) applying a dope solution including an acrylic polymer having a weight average molecular weight of 400,000 g/mol or more and a glass transition temperature of 110° C. or more, and an organic solvent on a substrate by a die;

b) evaporating the organic solvent to prepare an acrylic film; and c) peeling off the acrylic film from the substrate.

Other features and aspects will be apparent from the following detailed description, the drawings, and the claims.

Advantageous Effects

With the dope solution including an acrylic polymer according to the present invention, an optical film, more specifically a polarizing plate protective film may be prepared by a solvent casting method.

In addition, the polarizing plate protective film prepared using the dope solution according to the present invention has low moisture permeability, high thermal resistance, excellent smoothness and the less number of foreign substances.

MODE FOR INVENTION

Hereinafter, the embodiments of the present invention will be described in detail.

In an exemplary embodiment of the present invention, a dope solution for preparing a polarizing plate protective film, including an acrylic polymer having a weight average molecular weight of 400,000 g/mol or more and a glass transition temperature of 110° C. or more, and an organic solvent is provided.

In an exemplary embodiment of the present invention, the acrylic polymer may have a solid content of 10 to 40 wt %, and the dope solution may have a viscosity of 20,000 cps or more at 25° C.

In an exemplary embodiment of the present invention, the acrylic polymer may be a copolymer of at least two or more of (A) alkyl methacrylate-based monomer; or a copolymer of at least one or more of (A) alkyl methacrylate-based monomer with any one or two or more monomers selected from the group consisting of (B) alkyl acrylate-based monomer, (C) styrene-based monomer and (D) maleimide-based monomer.

In an exemplary embodiment of the present invention, the copolymer is produced by suspension polymerization in the presence of a suspension polymerization dispersing agent, and the suspension polymerization dispersing agent may be produced by polymerizing a compound represented by the following Chemical Formula 1, a compound represented by the following Chemical Formula 2, and alkyl (meth)acrylate:

[Chemical Formula 1]

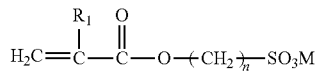

wherein $R_1$ is hydrogen or $C_1$ to $C_3$ alkyl; n is an integer selected from 0 to 3; and M is any one selected from the group consisting of lithium, sodium, potassium and ammonium,

[Chemical Formula 2]

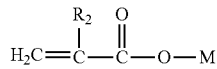

wherein $R_2$ is hydrogen or $C_1$ to $C_3$ alkyl; and M is any one selected from the group consisting of lithium, sodium, potassium and ammonium.

In an exemplary embodiment of the present invention, (A) the alkyl methacrylate-based monomer may be any one or a mixture of two or more selected from the group consisting of methyl methacrylate, ethyl methacrylate, isopropyl methacrylate, n-butyl methacrylate, t-butyl methacrylate, cyclohexyl methacrylate, isobornyl methacrylate, hydroxyethyl methacrylate and the like.

In an exemplary embodiment of the present invention, (B) the alkyl acrylate-based monomer may be any one or a mixture of two or more selected from the group consisting of methyl acrylate, ethyl acrylate, isopropyl acrylate, n-butyl acrylate, t-butyl acrylate, cyclohexyl acrylate, isobornyl acrylate, hydroxyethyl acrylate and the like.

(C) The styrene-based monomer may be any one or a mixture of two or more selected from the group consisting of styrene, α-methylstyrene, p-bromostyrene, p-methylstyrene, p-chlorostyrene and the like.

(D) The maleimide-based monomer may be any one or a mixture of two or more selected from the group consisting of phenylmaleimide, nitrophenylmaleimide, monochlorophenylmaleimide, dichlorophenylmaleimide, monomethylphenylmaleimide, dimethylphenylmaleimide, ethylmethylphenylmaleimide, cyclohexylmaleimide and the like.

In an exemplary embodiment of the present invention, the organic solvent may be halogenated hydrocarbon alone, or a mixed solvent of halogenated hydrocarbon with any one or two or more selected from the group consisting of ester, ketone, ether and alcohol.

In an exemplary embodiment of the present invention, the organic solvent may be a mixed solvent of methylene chloride and alcohol.

In an exemplary embodiment of the present invention, the dope solution may further include polycarbonate.

In an exemplary embodiment of the present invention, the dope solution may further include two-layered or three-layered impact resistant powder including an acryl rubber layer in a core layer or an intermediate layer.

In an exemplary embodiment of the present invention, the acryl rubber layer may be formed of a polymer of an aromatic vinyl-based monomer and an alkyl(meth)acrylate monomer having 1 to 15 carbon atoms.

In an exemplary embodiment of the present invention, the impact resistant powder may have an average particle diameter of 100 to 400 nm.

In an exemplary embodiment of the present invention, the impact resistant powder may have a solid content of 1 to 40 wt % in the dope solution.

A polarizing plate protective film prepared by a solvent casting method using the dope solution, and having a weight average molecular weight of 400,000 g/mol or more and a glass transition temperature of 110° C. or more is also included in the scope of the present invention.

In an exemplary embodiment of the present invention, the polarizing plate protective film may have a smoothness of 1.0 or less, and the number of foreign substances of 0.3/1 m or less.

In an exemplary embodiment of the present invention, the polarizing plate protective film may have moisture permeability of 200 g/m²-24 hrs or less in a range of film thickness of 20 to 80 μm.

In an exemplary embodiment of the present invention, the polarizing plate protective film may be a protective film for a polarizing plate.

Further, a polarizing plate including a polarizer; and the polarizing plate protective film disposed on at least one surface of the polarizer is also included in the scope of the present invention.

Further, an image display device including the polarizing plate is also included in the scope of the present invention.

In another general aspect, a method of preparing a polarizing plate protective film includes: a) applying a dope solution including an acrylic polymer having a weight average molecular weight of 400,000 g/mol or more and a glass transition temperature of 110° C. or more, and an organic solvent on a substrate by a die;

b) evaporating the organic solvent to prepare an acrylic film; and c) peeling off the acrylic film from the substrate.

In an exemplary embodiment of the method of preparing a polarizing plate protective film of the present invention, after step c), a step of uniaxially stretching or biaxially stretching, and a drying step may be further included.

In an exemplary embodiment of the method of preparing a polarizing plate protective film of the present invention, the organic solvent may be halogenated hydrocarbon alone, or a mixed solvent of halogenated hydrocarbon with any one or two or more selected from the group consisting of ester, ketone, ether and alcohol.

In an exemplary embodiment of the method of preparing a polarizing plate protective film of the present invention, the dope solution may include the acrylic polymer at a solid content of 10 to 40 wt %, and have a viscosity of 20,000 cps or more at 25° C.

In an exemplary embodiment of the method of preparing a polarizing plate protective film of the present invention, in step a), a temperature of the substrate when applying the dope solution may be −50 to 100° C., and in step b), the organic solvent may be evaporated to a range of residual solvent amount in an acrylic optical film being 0 to 40 wt %.

In an exemplary embodiment of the method of preparing a polarizing plate protective film of the present invention, the acryl optical film may have a thickness of 20 to 140 μm, and in a range of a film thickness of 20 to 80 μm, it may have moisture permeability of 200 g/m²-24 hrs or less.

In an exemplary embodiment of the present invention, the dope solution may further include polycarbonate.

In an exemplary embodiment of the method of preparing a polarizing plate protective film of the present invention, the dope solution may further include two-layered or three-layered impact resistant powder including an acryl rubber layer in a core layer or an intermediate layer.

In an exemplary embodiment of the method of preparing a polarizing plate protective film of the present invention, it is preferred to apply the dope solution including the impact resistant powder on the substrate, within a range of a viscosity change rate of the dope solution being 20% or less.

Hereinafter, each component of the present invention will be described in detail.

It is preferred to prepare the polarizing plate protective film according to the present invention by a solvent casting method using a dope solution. In the solvent casting method, a dope solution in which a resin is dissolved in an organic solvent is cast on a substrate, and the organic solvent is evaporated to form a film. If necessary, the thus-prepared film may be stretched by a stretching machine to prepare a film which is the final product. When preparing a film by the solvent casting method, in the case that the dope solution has unduly low or high viscosity, it is difficult to cast the dope solution on a substrate so that film preparation becomes impossible, and also, in the case that the condition such as the evaporation time and the evaporation temperature of the organic solvent used in the dope solution does not meet the physical properties of the resin used in the dope solution, the organic solvent is not sufficiently dried so that the film may not be peeled off from the substrate.

Thus, as a result of studying preparation of a film by a solvent casting method using an acrylic polymer, it was found that a film having an excellent peeling-off property and being easily formed by the solvent casting method may be prepared by using a polymer satisfying a certain range of the weight average molecular weight and glass transition temperature of an acrylic polymer, and when preparing the dope solution, adjusting the solid content so that the viscosity is 20,000 cps or more.

Specifically, it was found that by using the acrylic polymer having a weight average molecular weight of 400,000 g/mol or more, specifically 400,000 to 1,500,000 g/mol, and more specifically 600,000 to 1,200,000 g/mol, and a glass transition temperature of 110° C. or more, more specifically 110 to 150° C., and more specifically 110 to 130° C., the film may be prepared by the solvent casting method, thereby completing the present invention.

It is preferred to prepare the dope solution in the range of the weight average molecular weight satisfying the above range, since the solution has a suitable viscosity for being applied to the solvent casting method, and after preparing the film, it is easy to peel off the film from the substrate. In addition, when preparing the film by the solvent casting method, the organic solvent is evaporated so that the film may be peeled off from the substrate. In order to prepare a thin film by drying the organic solvent in a short time while preventing the physical properties of the acrylic resin from being changed in the process of evaporating the organic solvent, the acrylic polymer is required to have a glass transition temperature of 110 or more. When the glass transition temperature is less than 110° C., the thermal resistance is insufficient so that deformation of the film may easily occur under the hot and humid condition, and when the glass transition temperature is above 150° C., it is difficult to form the film such that productivity may be reduced.

Within the range satisfying the above weight average molecular weight and glass transition temperature, when mixing the acrylic polymer with the organic solvent so that the acrylic polymer has a solid content of 10 to 40 wt %, the dope solution having a viscosity of 20,000 cps or more, specifically 20,000 to 60,000 cps, more specifically 30,000 to 40,000 cps at 25° C. may be prepared. The above range of the above solid content and viscosity is preferred, since within the range, it is possible to cast the solution on the substrate with a relatively uniform thickness, and when drying the organic solvent after casting on the substrate, it is possible to dry at a relatively high temperature, and thus, a smooth and easily peeled-off, optical film may be prepared in a short time. When the solid content is above the range, the content of the solvent is relatively reduced, and thus, even in the case of satisfying the viscosity, it is not easy to apply the dope solution when casting it on the film substrate, and clogging of the nozzle and the like may occur. In addition, when the solid content is as low as less than the above range, the content of the solvent is relatively high, and thus, more energy is needed for drying the organic solvent, and it may be difficult to prepare a smooth optical film.

In an exemplary embodiment of the present invention, the acrylic polymer may be a copolymer of at least two or more of (A) alkyl methacrylate-based monomer; or a copolymer of at least one or more of (A) alkyl methacrylate-based monomer with any one or two or more monomers selected from the group consisting of (B) alkyl acrylate-based monomer, (C) styrene-based monomer and (D) maleimide-based monomer.

More specifically, an exemplary embodiment of the present invention may be selected from the following:

i) a copolymer of at least two or more of (A) alkyl methacrylate-based monomer;

ii) a copolymer of at least one or more of (A) alkyl methacrylate-based monomer with (B) alkyl acrylate-based monomer;

iii) a copolymer of at least one or more of (A) alkyl methacrylate-based monomer with (C) styrene-based monomer and (D) maleimide-based monomer; and iv) a copolymer of at least one or more of (A) alkyl methacrylate-based monomer with (B) alkyl acrylate-based monomer, (C) styrene-based monomer and (D) maleimide-based monomer.

The above i) to iv) may be an example for illustrating the present invention, and do not limit the present invention.

In an exemplary embodiment of the present invention, (A) the alkyl methacrylate-based monomer may be any one or two or more selected from the group consisting of methyl methacrylate, ethyl methacrylate, isopropyl methacrylate, n-butyl methacrylate, t-butyl methacrylate, cyclohexyl methacrylate, isobornyl methacrylate, hydroxyethyl methacrylate and the like.

In an exemplary embodiment of the present invention, (B) the alkyl acrylate-based monomer may be any one or a mixture of two or more selected from the group consisting of methyl acrylate, ethyl acrylate, isopropyl acrylate, n-butyl acrylate, t-butyl acrylate, cyclohexyl acrylate, isobornyl acrylate, hydroxyethyl acrylate and the like.

In an exemplary embodiment of the present invention, (C) the styrene-based monomer may be any one or a mixture of two or more selected from the group consisting of styrene, α-methylstyrene, p-bromostyrene, p-methylstyrene, p-chlorostyrene and the like.

In an exemplary embodiment of the present invention, (D) the maleimide-based monomer may be any one or a mixture of two or more selected from the group consisting of phenylmaleimide, nitrophenylmaleimide, monochlorophenylmaleimide, dichlorophenylmaleimide, monomethylphenylmaleimide, dimethylphenylmaleimide, ethylmethylphenylmaleimide and cyclohexylmaleimide and the like.

In an exemplary embodiment of the present invention, above i) may be a copolymer of two or more monomers selected from the group consisting of methyl methacrylate, ethyl methacrylate, isopropyl methacrylate, n-butyl methacrylate, t-butyl methacrylate, cyclohexyl methacrylate, isobornyl methacrylate, hydroxyethyl methacrylate and the like. More specifically, it may be a copolymer of methyl methacrylate and as a comonomer, any one or two or more monomers selected from the group consisting of ethyl methacrylate, isopropyl methacrylate, n-butyl methacrylate, t-butyl methacrylate, cyclohexyl methacrylate, isobornyl methacrylate, hydroxyethyl methacrylate and the like. More specifically, it may be a copolymer of 90 to 99 wt % of methyl methacrylate and 1 to 10 wt % of the above comonomer. More specifically, it may be a copolymer of 93 to 97 wt % of methyl methacrylate and 3 to 7 wt % of the above comonomer. The above content range is preferred, since within the range, a film having excellent optical properties and excellent thermal resistance may be prepared, and a film having excellent mechanical strength may be prepared, but the range is not limited thereto. More preferably, methyl methacrylate and n-butyl methacrylate may be mixed or methyl methacrylate and t-butyl methacrylate may be mixed, and by using them in combination, a film having excellent thermal resistance, a low haze, viscosity of the dope solution which is suitable for being applied to solvent casting, and low moisture permeability, may be provided.

In an exemplary embodiment of the present invention, above ii) may be a copolymer of at least one or more of (A) alkyl methacrylate-based monomers selected from the group consisting of methyl methacrylate, ethyl methacrylate, isopropyl methacrylate, n-butyl methacrylate, t-butyl methacrylate, cyclohexyl methacrylate, isobornyl methacrylate, hydroxyethyl methacrylate and the like with any one or two or more of (B) alkyl acrylate-based monomers selected from the group consisting of methyl acrylate, ethyl acrylate, isopropyl acrylate, n-butyl acrylate, t-butyl acrylate, cyclohexyl acrylate, isobornyl acrylate, hydroxyethyl acrylate and the like. More specifically, it may be a copolymer of 90 to 99 wt % of (A) the alkyl methacrylate-based monomer with 1 to 10 wt % of (B) the alkyl acrylate-based monomer. The above content range is preferred, since within the range, a film having excellent optical properties and excellent thermal resistance may be prepared, and a film having excellent mechanical strength may be prepared, but the range is not limited thereto.

In an exemplary embodiment of the present invention, above iii) may be a copolymer of at least one or more of (A) alkyl methacrylate-based monomers selected from the group consisting of methyl methacrylate, ethyl methacrylate, isopropyl methacrylate, n-butyl methacrylate, t-butyl methacrylate, cyclohexyl methacrylate, isobornyl methacrylate, hydroxyethyl methacrylate and the like with (C) styrene-based monomer and (D) maleimide-based monomer. More specifically, it may be a copolymer of 75 to 98 wt %, more preferably 85 to 95 wt % of (A) the alkyl methacrylate-based monomer with 0.1 to 10 wt %, more preferably 0.5 to 5 wt % of (C) the styrene-based monomer, and 1 to 15 wt %, more preferably 2 to 13 wt % of (D) the maleimide-based monomer. The above content range is preferred, since within the range, a film having excellent optical properties and excellent thermal resistance may be prepared, and a film having excellent mechanical strength may be prepared, but the range is not limited thereto. In addition, an effect of reducing residual monomers contained in the copolymer prepared by mixing the styrene-based monomer and the maleimide-based monomer in the above range to improve polymerization efficiency between each monomer may be expected, and an acrylic polymer having improved thermal resistance and low moisture permeability may be obtained.

In an exemplary embodiment of the present invention, above iv) may be a copolymer of at least one or more of (A) alkyl methacrylate-based monomers selected from the group consisting of methyl methacrylate, ethyl methacrylate, isopropyl methacrylate, n-butyl methacrylate, t-butyl methacrylate, cyclohexyl methacrylate, isobornyl methacrylate, hydroxyethyl methacrylate and the like with (B) alkyl acrylate-based monomer, (C) styrene-based monomer and (D) maleimide-based monomer. More specifically, it may be a copolymer of 75 to 97 wt %, more preferably 85 to 95 wt % of (A) the alkyl methacrylate-based monomer with 1 to wt %, more preferably 1 to 5 wt % of (B) the alkyl acrylate-based monomer, 0.1 to 10 wt %, more preferably 0.5 to 5 wt % of (C) the styrene-based monomer, and 1 to 15 wt %, more preferably 2 to 13 wt % of (D) the maleimide-based monomer. The above content range is preferred, since within the range, a film having excellent optical properties and excellent thermal resistance and mechanical strength may be prepared, but the range is not limited thereto. In addition, an effect of reducing residual monomers contained in the copolymer prepared by mixing the styrene-based monomer and the maleimide-based monomer in the above range to improve polymerization efficiency between each monomer may be expected, and an acrylic polymer having improved thermal resistance and low moisture permeability may be obtained.

The polymer herein includes a homopolymer or a copolymer, the copolymer refers to a polymer in which the element mentioned as the monomer herein is polymerized to be included as a repeating unit in the copolymer resin, and the copolymer herein may be a block copolymer or a random copolymer, but not limited thereto.

In an exemplary embodiment of the present invention, the acrylic polymer may be prepared by emulsion polymerization or suspension polymerization, and more preferably, may be prepared by suspension polymerization in the presence of a suspension polymerization dispersing agent produced by polymerizing a compound represented by the following Chemical Formula 1, a compound represented by the following Chemical Formula 2, and alkyl(meth)acrylate:

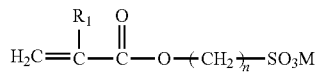

[Chemical Formula 1]

wherein $R_1$ is hydrogen or $C_1$ to $C_3$ alkyl; n is an integer selected from 0 to 3; and M is any one selected from the group consisting of lithium, sodium, potassium and ammonium,

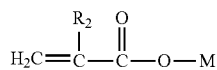

[Chemical Formula 2]

wherein $R_2$ is hydrogen or $C_1$ to $C_3$ alkyl; and M is any one selected from the group consisting of lithium, sodium, potassium and ammonium.

By carrying out suspension polymerization in the presence of the suspension polymerization dispersing agent, the acrylic polymer having better transparency, excellent optical properties, a high molecular weight, and at the same time, less particle flocculation may be prepared, thereby allowing the preparation of the film having excellent optical properties by the solvent casting method. Further, though not described in the Examples, when the dope solution is prepared with the acryl polymer prepared by using the suspension polymerization dispersing agent, an excellent effect of reducing change of the dope solution over time was represented.

More specifically, a monomer mixture including 60 to 70 wt % of the monomer of Chemical Formula 1, 5 to 15 wt % of the monomer of Chemical Formula 2 and 15 to 35 wt % of the alkyl(meth)acrylate-based monomer may be uniformly polymerized in an aqueous solution in the presence of an initiator. As the initiator, for example, an azo-based initiator such as 2,2-azobis(2-methylpropionamidine)dihydrochloride, 2,2'-azobis(isobutyronitrile), 2,2'-azobis(2,4-dimethylvaleronitrile), 2,2'-azobis(4-methoxy-2,4-dimethylvaleronitrile), dimethyl 2,2'-azobis(2-methylpropionate), 2,2'-azobis[2-(2-imidazolin-2-yl) propane]dihydrochloride and 2,2'-azobis[N-(2-carboxyethyl)-2-methylpropionamidine]hydrate may be used, but the present invention is not limited thereto. By using the suspension polymerization dispersing agent, dispersibility is more improved, the content of unreacted monomers is more reduced, the reaction is stabilized, and the particle diameter of the obtained copolymer is uniform, thereby more improving the film formation stability when preparing the polarizing plate protective film.

The suspension polymerization dispersing agent may have a weight average molecular weight of 100,000 to 5,000,000 g/mol, more specifically 1,000,000 to 3,000,000 g/mol. The range is preferred, since a polymer having uniform shape and particle size distribution may be prepared, however, the range is not limited thereto.

The compound represented by Chemical Formula 1 may be any one or a mixture of two or more selected from the group consisting of 3-sulfopropyl acrylate potassium salt, 3-sulfopropyl methacrylate potassium salt, 2-sulfoethyl methacrylate sodium salt and 2-sulfoethyl acrylate sodium salt.

The suspension polymerization dispersing agent may have a solid content of 1 to 10 wt %, more preferably 3 to 6 wt %.

When polymerizing the copolymer of the present invention, the suspension polymerization dispersing agent having the solid content of 1 to 10 wt % may be used at 0.001 to 1.0 part by weight, more preferably 0.005 to 0.6 parts by weight, based on 100 parts by weight of the total monomer. Within the range, good copolymer particles may be obtained, polymerization stability is excellent, and loss of the copolymer particles in washing and drying processes is small, so that workability and economic feasibility are good.

In addition, the polymerization may be carried out in the presence of a suspension polymerization initiator and a chain transfer agent. More specifically, any initiator may be used without limitation, as long as it is an organic peroxide initiator, and specifically, for example, t-butylperoxy-2-ethylhexanoate, t-amylperoxy-2-ethylhexanoate, 1,1-bis(t-butylperoxy)-3,3,5-trimethyl cyclohexane, 1,1-bis(t-butylperoxy) cyclohexane, 1,1-bis(t-butylperoxy)-2-methyl cyclohexane, 2,2-bis(4,4-di-t-butylperoxy cyclohexyl)propane, 1,1-di-(t-amylperoxy) cyclohexane and a mixture thereof may be listed, but the present invention is not limited thereto. The initiator may be included at 0.05 to 0.5 parts by weight, more preferably 0.1 to 0.3 parts by weight, based on 100 parts by weight of the total monomer content. The above range is preferred, since within the range, the desired molecular weight may be obtained, and it is easy to control heat of reaction of a reactor, but the range is not limited thereto.

Any chain transfer agent may be used without limitation, as long as it is apparently known in the art, and specifically, for example, $C_1$ to $C_{12}$ alkyl mercaptan having one thiol functional group or polythiol mercaptan having two or more thiol functional groups may be used. Specifically, for example, isopropyl mercaptan, normal butyl mercaptan, tertiary-butyl mercaptan, tertiary-dodecyl mercaptan, normal-aryl mercaptan, normal-octyl mercaptan, normal-dodecyl mercaptan and the like may be used. The content may be 0.01 to 0.2 parts by weight, based on 100 parts by weight of the total monomer weight, and this range is preferred, since within the range, the acrylic polymer having a weight average molecular weight of 400,000 g/mol or more may be prepared.

In addition, if necessary, a dispersing aid may be further included, and any dispersing aid may be used without limitation, as long as it is selected from apparently known metal salts or ammonium salts in the art. As a specific example thereof, magnesium sulfate, sodium sulfate, ammonium sulfate and the like may be used. The content of the dispersing aid is not limited, but the dispersing aid may be used so that the content ratio of the dispersing agent: dispersing aid is 1:5 to 5:1. The above range is preferred, since within the range, the average particle diameter and particle size distribution of the polymer particles may be controlled.

Furthermore, when preparing the acrylic polymer, various additives commonly used in the art, for example, a plasticizer, an antioxidant, a UV stabilizer, a thermal stabilizer and the like may be further included, as required. Here, the additives may be included at a suitable content within the range not affecting the physical properties of the acrylic polymer, and for example, included approximately at 0.1 to 5 parts by weight, based on 100 parts by weight of the total monomer content.

The dope solution of the present invention includes the acrylic polymer prepared as described above and the organic solvent.

The acrylic polymer may have a solid content of 10 to 40 wt %, more preferably 20 to 35 wt %. The solid content range is preferred, since within the range, the acrylic polymer has suitable viscosity for continuously preparing a film, may be completely dissolved in the organic solvent, and is suitable for preparing a film having a thickness of 5 to 100 μm, preferably 20 to 80 μm. Within the solid content range, the dope solution having a viscosity less than 20,000 cps at 25° C. has high flowability, and thus, has difficulty in film formation. Within the solid content range, it is appropriate to continuously form a film, using the doping solution having a viscosity of 20,000 cps or more, specifically 20,000 to 60,000 cps, more preferably 30,000 to 40,000 cps at 25° C., and produced by using the acrylic polymer having a weight average molecular weight of 400,000 g/mol or more and a glass transition temperature of 110° C. of more.

The organic solvent is not limited, as long as it may dissolve the acrylic polymer, however, preferably, halogenated hydrocarbon may be used, and the halogenated hydrocarbon includes hydrocarbon chloride, methylene chloride and chloroform, and among them, methylene chloride is most preferred. Otherwise, if necessary, an organic solvent other than halogenated hydrocarbon may be mixed to be used. As the organic solvent other than halogenated hydrocarbon, ester, ketone, ether, alcohol and the like are included. As the esters, methyl formate, ethyl formate, propyl formate, pentyl formate, methyl acetate, ethyl acetate, pentyl acetate, and the like may be used. As ketones, acetone, methyl ethyl ketone, diethyl ketone, diisobutyl ketone, cyclopentanone, cyclohexanone, methyl cyclohexanone, and the like may be used. As ethers, diisopropyl ether, dimethoxy methane, dimethoxy ethane, 1,4-dioxane, 1,3-dioxolane, tetrahydrofuran, anisole, penetol, and the like may be used. As alcohols, methanol, ethanol, 1-propanol, 2-propanol, 1-butanol, 2-butanol, t-butanol, 1-pentanol, 2-methyl-2-butanol, cyclohexanol, 2-fluoroethanol, 2,2,2-trifluoroethanol, 2,2,3,3-tetrafluoro-1-propanol, and the like may be used.

More preferably, methylene chloride may be used as a main solvent, and alcohol such as methanol and ethanol may be used as a minor solvent. Specifically, methylene chloride and alcohol may be used at a mixed weight ratio of 80 to 99:20 to 1, more preferably 85 to 90:15 to 10.

In addition, various additives such as for example, a plasticizer, an ultraviolet inhibitor, a deterioration inhibitor, fine particles, release agent, infrared absorbing agent and optical anisotropy controlling agent may be added as required. The specific kinds of such additives may not be limited as long as they are conventionally used in the art, and it is preferred that the content thereof is used within a range of not deteriorating the physical properties of the film. The time to add the additive is determined depending on its kind. The additive may be added at the end of the preparation of the dope.

The plasticizer is used for improving mechanical strength of film, and may shorten the drying process time of film if used. As the plasticizer, any conventionally used one may be used without limitation, and for example, carboxylic acid esters selected from phosphoric acid ester, phthalic acid ester, citric acid ester and the like are listed. As the phosphoric acid ester, triphenyl phosphate (TPP), biphenyldiphenyl phosphate and tricresyl phosphate (TCP), and the like may be listed. As the phthalic acid ester, dimethyl phthalate (DMP), diethyl phthalate (DEP), dibutyl phthalate (DBP), dioctyl phthalate (DOP), diphenyl phthalate (DPP) and diethylhexyl phthalate (DEHP), and the like may be listed. As the citric acid ester, o-acetyltriethyl citrate (OACTE) and o-acetyltributyl citrate (OACTB), and the like may be listed. As other examples of carboxylic acid ester, butyl oleate, methylacetyl lysine oleate, dibutyl sebacate, and various trimelitic acid esters may be listed. Preferably, a phthalic acid ester plasticizer is used. The content of the plasticizer may be 2 to 20 parts by weight, more preferably 5 to 15 parts by weight, based on 100 parts by weight of the acrylic polymer.

As the ultraviolet inhibitor, a hydroxybenzophenone-based compound, a benzotriazole-based compound, a triazine-based compound, a salicylic acid ester-based compound, a cyanoacrylate-based compound, and the like may be used. The amount of the ultraviolet inhibitor may be 0.1 to 3 parts by weight, more preferably 0.5 to 2 parts by weight, based on 100 parts by weight of the acrylic polymer.

As the deterioration inhibitor, for example, an antioxidant, a peroxide decomposer, a radical inhibitor, a metal deactivator, an oxygen scavenger, a light stabilizer such as hindered amine, and the like may be used. As especially preferred example of the deterioration inhibitor, butylated hydroxytoluene (BHT) and tribenzylamine (TBA) may be listed. The amount of the deterioration inhibitor may be 0.01 to 5 parts by weight, more preferably 0.1 to 1 part by weight, based on 100 parts by weight of the acrylic polymer.

The fine particles are added in order to satisfactorily maintain anti-curling of film, conveyability, anti-adhesion or scratch resistance in roll form, and any particles selected from an inorganic compound or an organic compound may be used. For example, as an inorganic compound, silicon-containing compound, silicon dioxide, titanium oxide, zinc oxide, aluminum oxide, barium oxide, zirconium oxide, strontium oxide, antimony oxide, tin oxide, tin-antimony oxide, calcium carbonate, talc, clay, calcined kaolin, calcined calcium silicate, hydrous calcium silicate, aluminum silicate, magnesium silicate, calcium phosphate, and the like are preferred, and more preferably, inorganic compound containing silicon or zirconium oxide, and the like may be used. The fine particles may have an average primary particle diameter of 80 nm or less, preferably 5 to 80 nm, more preferably 5 to 60 nm, particularly preferably 8 to 50 nm.

In addition, if necessary, a wavelength dispersion adjusting agent may be further added. Such additive may be used without limitation, as long as it is generally used in the field.

In addition, if necessary, an optional retardation additive may be further included, in order to further increase or further decrease retardation. Any retardation additive may be used without limitation, as long as it is generally used for adjusting retardation in the art. Usually, in an optical film for being applied to a liquid crystal display in VA mode, an additive for increasing retardation may be used, and in an optical film for being applied to a liquid crystal display in IPS mode, an additive for reducing retardation may be used. The retardation additive may be used at 1 to 15 parts by weight, more preferably 3 to 10 parts by weight, based on 100 parts by weight of the acrylic polymer, since in this range, bleeding may not occur, and a high quality image may be formed.

Further, the dope solution of the present invention may further include polycarbonate. Since the polycarbonate is added for adjusting a phase difference, it may be included at 0.1 to 10 parts by weight, more preferably 1 to 5 parts by weight, based on 100 parts by weight of the acrylic monomer.

Further, the dope solution of the present invention may further include impact resistant powder. The impact resistant powder refers to two-layered or three-layered acrylic latex powder including an acryl rubber layer in a core layer or an intermediate layer. It was confirmed that by further including the impact resistant powder, a peeling-off property when preparing a film as well as impact resistance of a film is improved, thereby improving film forming workability and processability. The impact resistant powder may have an average particle diameter of 100 to 400 nm, since in this range, smoothness is less affected, optical properties of a film is excellent, and improvement of impact resistance may be expected when preparing a film having a thickness of 20 to 80 μm. In addition, the impact resistant powder may be included at 1 to 50 wt % in the dope solution, and not limited thereto, however, this range is preferred, since within this range, the desired impact resistant may be further improved, while reduced physical properties of the film may be prevented, and a viscosity change rate of the dope solution during the time required for film formation is 20% or less.

In addition, when the impact resistant powder is further included, the impact resistant powder swells to change the viscosity of the dope solution, however, when preparing a film by the solvent casting method after preparing the dope solution, it is possible to prepare the film before swelling within the process time to prepare the film. More preferably, when the impact resistant powder is included, it is preferred to form a film in a range of the viscosity change rate of the dope solution being less than 20%, specifically 0 to 20%, more preferably 0 to 10%, since there is no filter clogging and a film forming property is excellent. The viscosity change may be calculated by the following Equation 1:

Viscosity change rate=(Final viscosity−Initial viscosity)/Initial viscosity×100   [Equation 1]

wherein Initial viscosity refers to the viscosity initially measured after preparing a dope solution; and Final viscosity refers to the viscosity finally measured after preparing a dope solution and storing it.

More specifically, a first embodiment of the impact resistant powder is two-layered impact resistant powder including a core layer and a shell layer, wherein the core layer may be formed of acryl rubber.

A second embodiment of the impact resistant powder is three-layered impact resistant powder including a seed layer, a core layer and a shell layer, wherein the core layer or an intermediate layer may be formed of acryl rubber.

The above first and second embodiments may be an example for illustrating the impact resistant powder of the present invention, and the present invention is not limited thereto.

The impact resistant powder according to an exemplary embodiment of the present invention includes a layer formed of acryl rubber, thereby improving tensile strength of a film. The acryl rubber layer is not limited, however, it is preferred that the acryl rubber layer is included at 40 to 80 wt %, more preferably 50 to 70 wt %, based on the total weight of the impact resistant powder, for satisfying the above physical properties, but not limited thereto.

The impact resistant powder may be prepared by emulsion polymerization. More specifically, the three-layered impact resistant powder may be prepared by a first stage polymerization of adding an acrylic monomer, an emulsifier, a grafting agent and an initiator to ion-exchange water to prepare seed particles having a glass transition temperature of 20° C. or more; a second stage polymerization of adding an acrylic monomer, a comonomer, a crosslinker, an emulsifier, an initiator and a grating agent to the polymer prepared in the first stage polymerization to graft a rubbery core having a glass transition temperature of 0° C. or less on the seed particles; and a third stage polymerization of adding an acrylic monomer and an initiator to the polymer prepared in the second stage polymerization to graft a glassy shell having a glass transition temperature of 20° C. or more on the core.

In the first stage polymerization, when the temperature of the ion-exchange water in the reactor under a nitrogen stream is 70 to 90° C., an acrylic monomer, an emulsifier, a grafting agent and an initiator are added to obtain glassy seed particles. It is preferred that the acrylic monomer used in the first stage polymerization is used at 1 to 40 wt %, based on the total weight of the monomer used in the preparation of the impact resistant powder.

In the second stage polymerization, an acrylic monomer for forming a rubber phase in the polymer by the first stage polymerization, and styrene or a styrene derivative substituted with halogen or an alkyl or aryl group having 1 to 20 carbon atoms for adjusting a refractive index as a comonomer may be used for polymerization in a small amount. It is preferred that the contents of the acrylic monomer and the comonomer for grafting a rubbery core on the seed particles are 40 to 80 wt %, more preferably 50 to 70 wt %, based on the total weight of the monomer used in preparing the impact resistant powder, since excellent impact resistance is expressed, but not limited thereto. Here, the acrylic monomer and the comonomer may be mixed at a weight ratio of 4 to 9:1.

The third stage polymerization is for grafting a glassy shell on the core, and it is preferred that the contents of the acrylic monomer used herein is 10 to 40 wt %, based on the total weight of the monomer used in preparing the impact resistant powder. In addition, it is preferred that the particle size of the impact resistant powder on which the final glassy shell is grafted is also uniform.

As the acrylic monomer used in preparing the impact resistant powder, any one or a mixture of two or more selected from the group consisting of an aromatic vinyl-based monomer, an alkyl(meth)acrylate monomer having 1 to 15 carbon atoms and (meth)acrylic acid monomer having 1 to 15 carbon atoms may be preferably used. Specifically, for example, as the aromatic vinyl-based monomer, styrene may be used, and as the alkyl(meth)acrylate monomer having 1 to carbon atoms, any one or a mixture of two or more selected from the group consisting of ethyl acrylate, ethyllmethacrylate, methyl acrylate, methyl methacrylate, butyl acrylate, butyl methacrylate and the like may be used, but the present invention is not limited thereto.

In an exemplary embodiment of the present invention, the acryl rubber may be a polymer of an aromatic vinyl-based monomer and an alkyl(meth)acrylate monomer having 1 to 15 carbon atoms among the acrylic monomers, and more specifically, for example, may be a polymer of butyl acrylate and styrene.

As the emulsifier, an anionic emulsifier, for example, alkaline alkyl phosphate having 4 to 30 carbon atoms, alkyl sulfate such as sodium dodecylsulfate and sodium dodecylbenzenesulfate and the like may be used, but the present invention is not limited thereto, and the used amount thereof is preferably 0.02 to 4 parts by weight, based on 100 parts by weight of the total monomer used in preparing the impact resistant powder.

As the crosslinker, any one or a mixture of two or more selected from the group consisting of 1,2-ethandioldi(meth)acrylate, 1,3-propanedioldi(meth)acrylate, 1,3-butanedioldi(meth)acrylate, 1,5-pentanedioldi(meth)acrylate, 1,6-hexanedioldi(meth)acrylate, divinylbenzene, ethyleneglycoldi(meth)acrylate, propyleneglycoldi(meth)acrylate, butyleneglycoldi(meth)acrylate, triethyleneglycoldi(meth)acrylate, polyethyleneglycoldi(meth)acrylate, polypropyleneglycoldi(meth)acrylate, polybutyleneglycoldi(meth)acrylate, allyl(meth)acrylate and the like may be used, but the present invention is not limited thereto, and the used amount thereof may be 0.1 to 10 parts by weight, based on 100 parts by weight of the total monomer used in preparing the impact resistant powder.

As the grafting agent, one or more monomers having a double bond having different reactivity from each other such as allyl(meth)acrylate or diallylmalate may be used, but the present invention is not limited thereto, and the used amount thereof is preferably 0.1 to 10 parts by weight, based on 100 parts by weight of the total monomer used in preparing the impact resistant powder.

As the initiator used in preparing the impact resistant powder, any one or a mixture of two or more selected from the group consisting of an azo-based compound, a peroxide-based compound and the like may be used, in the presence of ferrous sulfate, sodium ethylenediaminetetraacetate and sodium formaldehyde sulfoxylate, but the present invention is not limited thereto.

The azo-based compound may be, for example, any one or a mixture of two or more selected from the group consisting of 2,2'-azobis(isobutyronitrile), 2,2'-azobis(2,4-dimethylvaleronitrile), 2,2'-azobis(4-methoxy-2,4-dimethylvaleronitrile), dimethyl 2,2'-azobis(2-methylpropionate), 2,2'-azobis[2-(2-imidazolin-2-yl) propane]dihydrochloride and 2,2'-azobis[N-(2-carboxyethyl)-2-methylpropionamidine]hydrate, but not limited thereto.

The peroxide-based compound may be any one or a mixture of two or more selected from the group consisting of tetramethylbutylperoxy neodecanoate, bis(4-butylcyclohexyl)peroxydicarbonate, di(2-ethylhexyl)peroxy carbonate, butylperoxy neodecanoate, dipropyl peroxy dicarbonate, diisopropyl peroxy dicarbonate, diethoxyethyl peroxy dicarbonate, diethoxyhexyl peroxy dicarbonate, hexyl peroxy dicarbonate, dimethoxybutyl peroxy dicarbonate, bis(3-methoxy-3-methoxybutyl) peroxy dicarbonate, dibutyl peroxy dicarbonate, dicetylperoxy dicarbonate, dimyristyl peroxy dicarbonate, 1,1,3,3-tetramethylbutyl peroxypivalate, hexyl peroxy pivalate, butyl peroxy pivalate, trimethyl hexanoyl peroxide, dimethyl hydroxybutyl peroxyneodecanoate, amyl peroxyneodecanoate, butyl peroxyneodecanoate, t-butylperoxy neoheptanoate, amylperoxy pivalate, t-butylperoxy pivalate, t-amyl peroxy-2-ethylhexanoate, lauryl peroxide, dilauroyl peroxide, didecanoyl peroxide, benzoyl peroxide, dibenzoyl peroxide, 2,2-bis(tert-butylperoxy) butane, 1,1-bis(tert-butylperoxy)cyclohexane, 2,5-bis(butylperoxy)-2,5-dimethylhexane, 2,5-bis(tert-butylperoxy)-1-methylethyl)benzene, 1,1-bis(tert-butylperoxy)-3,3,5-trimethylcyclohexane, tert-butyl hydroperoxide, tert-butyl peroxide, tert-butyl peroxybenzoate, tert-butylperoxy isopropyl carbonate, cumene hydroxyperoxide, dicumyl peroxide, lauroyl peroxide, 2,4-pentanedione peroxide, tert-butyl peracetate, peracetic acid, potassium persulfate and the like, but not limited thereto.

The used amount thereof may be 0.001 to 10 parts by weight, based on 100 parts by weight of the total monomer used in preparing the impact resistant powder, but not limited thereto.

When preparing the impact resistant powder of the present invention, the two-layered impact resistant powder of the first embodiment is prepared by omitting the first stage polymerization from the preparation of the three-layered impact resistant powder of the second embodiment, and the following process may be identical to the preparation method of the second embodiment. Specifically, a first stage polymerization of adding an acrylic monomer, a comonomer, a crosslinker, an emulsifier, an initiator and a grafting agent to ion-exchange water to prepare a rubbery core having a glass transition temperature of 0 or less; and a second stage polymerization of adding an acrylic monomer and an initiator to the polymer prepared in the first stage polymerization to graft a glassy shell having a glass transition temperature of 20 or more on the core, thereby preparing impact resistant powder, are included.

In order to prepare the polarizing plate protective film according to the present invention, the dope solution may be prepared, and cast on a surface of the substrate by a die to be applied in a sheet form, and the solvent present in a casting solution may be evaporated by drying equipment to form an acryl film. The die is for extruding the casting solution, and for example, a general T-die may be used. The substrate is for forming a film by drying the casting solution while transferring it, and a metal substrate in a conveyor belt form may be used, and more specifically a stainless steel conveyor belt may be used, and a thickness of the film may be adjusted by controlling a moving or rotation speed of the belt.

The casting solution applied on the belt is moved together with the belt for a sufficient time and distance to form a film, and then peeled off from the belt by a peeling roller which is a guide roller. The peeled film is transferred to a stretching machine, stretched in a horizontal or machine direction, and dried in a dryer to form a final acryl film, and then wound in a winder to be shipped as a product.

The polarizing plate protective film according to the present invention may have moisture permeability of 200 g/m²-24 hrs or less in a range of film thickness of 20 to 80 µm. The moisture permeability is measured using a moisture permeability meter (available as PERME (W3/0120) from LabThink), in which a film is passed through from an outer cell under the condition of a temperature applied to the specimen of the film being 38° C., relative humidity (RH) of the outer cell of 90%, and $N_2$ carrier gas, and moisture permeated into the inner cell is measured. Since the polarizing plate protective film according to the present invention has very low moisture permeability, as compared with the conventional cellulose acylate film, it is suitable for being applied as an optical film of a liquid crystal display which is thinned, and since it has the moisture permeability satisfying the above range, damage of a polarizer when preparing a polarizing plate may be prevented, and change of the physical properties of an optical film may be prevented even during a preparation process of a liquid crystal display and under the hot and humid environment during transfer.

Further, the polarizing plate protective film of the present invention may have a phase difference value in a plane direction represented by the following Equation 2 of −50 to +50 nm, and a phase difference value in a thickness direction represented by the following Equation 3 of −50 to +50 nm:

$$R_{in}=(n_x-n_y)\times d \qquad \text{[Equation 2]}$$

$$R_{th}=(n_z-n_y)\times d \qquad \text{[Equation 3]}$$

wherein $n_x$ is a refractive index in a largest refractive index direction in a plane direction of a film; $n_y$ is a refractive index in a vertical direction of an $n_x$ direction in a plane direction of a film; $n_z$ is a refractive index in a thickness direction; and d is a thickness of a film.

Further, the optical film prepared by the solvent casting method using the dope solution of the present invention has excellent smoothness, and has less foreign substances, thereby representing excellent physical properties for use as an optical film. More specifically, the physical properties of smoothness of 1.0 or less, more specifically 0 to 1.0, and the number of foreign substances of 0.3 or less, more specifically 0 to 0.3 per 1 m may be satisfied.

Next, the preparation method of the polarizing plate protective film of the present invention will be described in detail.

In an exemplary embodiment of the present invention, the polarizing plate protective film may be prepared by a common solvent casting method. More specifically, the prepared dope solution is once stored in a reservoir, and foam contained in the dope solution is removed. The defoamed dope is sent from a dope outlet to a pressurized type die through a pressurized type quantitative gear pump capable of quantitatively feeding liquid with high precision according to the rotation number, and evenly cast on a metal substrate endlessly running from slot (slit) of the pressurized type die, thereby peeling the less dried casting film from the metal substrate at the peeling point where the metal substrate almost makes a round. Both ends of the prepared web are clipped to maintain the width, and the web is returned to a tenter to be dried, then returned to a roller in drying equipment to be dried, and wound in a predetermined length by a winding machine. In addition, in preparation of the casting film, after peeling off in the state of the residual solvent amount of 0 to 40 wt %, more specifically 0.1 to 20 wt %, uniaxial or biaxial stretching in a machine direction and width directions is also possible. Otherwise, offline stretching after preparing the casting film is also possible. Stretching of a film may be in a machine or width direction, or biaxial stretching simultaneously or sequentially. A stretching degree may be adjusted as required, specifically for example, in a range of 0 to 100%, specifically 0.1 to 100%. In the stretching degree, % refers to % of length, and for example, a stretching degree of 100% to a film having a length before stretching of 1 m means that the film is stretched to 2 m. In addition, after the stretching, a step of drying the film may be further included. Here, drying temperature is not limited as long as an organic solvent may be completely dried, however, it may be preferably 50 to 120° C.

It is preferred that the temperature when stretching is the glass transition temperature (TO of the acrylic polymer used in the dope solution ±10° C. The space temperature in applying the solution is preferably −50 to 50° C., more preferably −30 to 40° C., most preferably −20 to 30° C. The dope solution applied at low space temperature is instantaneously cooled on the substrate to improve gel strength, and thus, a film on which an organic solvent remains is obtained. Therefore, the film may be peeled off from the substrate in a short time, without evaporating the organic solvent. As a space-cooling gas, conventional air, nitrogen, argon, or helium may be used. The relative humidity is preferably 0 to 70%, more preferably 0 to 50%.

The temperature of the substrate on which the dope solution is applied is preferably −50 to 100° C., more preferably −30 to 25° C., most preferably 10 to 25° C. In order to cool the casting part, cooled gas may be introduced to the casting part. By disposing a cooling device on the casting part, the space may be cooled. In cooling, it is important to be careful not to attach water on the casting part. In the case of cooling by gas, it is preferred to dry gas in advance.

The thickness of the optical film according to the present invention is preferably in a range of 20 to 140 μm, more preferably in a range of 20 to 80 μm.

The polarizing plate protective film according to the present invention may be used in not only a polarizing plate, but also an optical film such as an optical compensation sheet or an optical filter for stereoscopic images, and in the laminated form in one piece or two pieces or more.

More specifically, the polarizing plate protective film of the present invention may be used as a protective film of the polarizing plate. An example of the polarizing plate of the present invention includes a polarizer and two polarizing plate protective films protecting both surfaces of the polarizer, and at least one of the protective films may be formed of the polarizing plate protective film of the present invention.

Further, an image display including the polarizing plate is also included in the scope of the present invention. For example, the display may be a liquid crystal display. The optical film of the present invention may be used in the liquid crystal display in various display modes, and specifically, in modes such as TN, IPS, FLC, AFLC, OCB, STN, ECB, VA and HAN.

An exemplary embodiment of the liquid crystal display according to the present invention may include a liquid crystal cell; and a polarizing plate disposed on at least one surface of the liquid crystal cell. Here, the polarizing plate may include a polarizer; and at least one layer of the polarizing plate protective film. In addition, the optical compensation sheet includes an optical anisotropic layer on at least one surface of the polarizing plate protective film, and the optical anisotropic layer may contain a hybrid orientated disc compound.

Hereinafter, the present invention will be described in more detail with reference to the Examples and Comparative Examples. However, the following Examples and Comparative Examples are only an example for describing the present invention in detail, and do not limit the present invention in any way.

Hereinafter, the physical properties of the film were measured by the following measuring methods.

1. Glass transition temperature ($T_g$): measured at a heating rate condition of 10° C./min using a differential scanning calorimeter (DSC).

2. Weight average molecular weight: measured using gel permeation chromatography (GPC) by dissolving prepared beads and films in tetrahydrofuran.

The weight average molecular weight was measured using gel permeation chromatography (GPC) equipment from Waters. The equipment included a mobile phase pump (M515 Pump), a column heater (ALLCOLHTRB), a detector (2414 R.I. Detector), an injector (2695 EB automatic injector), the analytical column was Styragel HR from WATERS, and the standard material was polymethyl methacrylate (PMMA) American polymer standard corporation STD. The mobile phase solvent was HPLC grade tetrahydrofuran (THF), and the measurement was carried out under the condition of a column heater temperature of 40° C., and a mobile phase solvent flow rate of 1.0 mL/min. A copolymer prepared for sample analysis was dissolved in tetrahydrofuran (THF) as the mobile phase solvent, and then injected into GPC equipment to measure a weight average molecular weight.

3. Residual monomer: after polymerization, the residual monomer in a resin was quantitatively measured by a gas chromatography (GC) analyzer.

4. Phase difference: the phase difference of the prepared film was measured using a birefringence measurement device (Axoscan from Axometrics) at a measurement wavelength of 550 nm.

5. Haze and light transmittance: measured according to ASTM 1003.

6. Tensile strength: measured according to ASTM D638 using a universal testing machine (UTM, Zwick).

7. Moisture permeability: a film was passed through from an outer cell for 24 hours under the condition of a temperature applied to a film specimen in a sealed chamber being 38° C., relative humidity (RH) of the outer cell of 90%, and $N_2$ carrier gas, using a moisture permeability meter (available as PERME (W3/0120) from LabThink), and moisture permeated into the inner cell was measured.

8. Coating adhesion: a coated surface on the film was cut to have 100 spaces of 10 in width×10 in length therein, and then 3M tape was attached and detached, thereby evaluating an adhesion degree of the coating layer.

Herein, the result was indicated as good when 95 spaces or more were left, normal when 85 spaces or more were left, and poor when 85 spaces or less were left.

9. Smoothness: film thickness was measured at 50 mm intervals over the entire width, and a difference between the maximum value and the minimum value was calculated. The film thickness was measured by a Micrometer from Mahr, Germany.

10. Foreign substance test: unmelted black spots, white spots and the like including foreign substances such as dust were detected, and the running film was measured using a film tester from NEXTEYE after preparing the film. It is expressed as the number of foreign substances per 1 meter of the film in a length direction, and when one foreign substance occurs during a 10 m run, it is represented as 0.1/1 m.

11. Viscosity: after preparing a dope solution at 25° C., viscosity was measured by falling ball viscometry. Measurement was carried out using Model KF40, a falling ball viscometer from Brookfield with a ball No. 6.

12. Peeling-off property: after casting a dope solution on a metal belt surface, the film was dried so that the residual solvent amount in the film is 2 wt % or 50 wt %, and evaluated while being peeled. A residual solvent amount is calculated by the following equation:

Residual solvent amount (%)=weight of film after drying/weight of film before drying×100

Excellent: surface of the film is smooth and the film is easily peeled off.

Normal: the film is peeled off without rupture.

Bad: the film makes noise when being peeled, and some rupture occurs.

[Preparation Example 1] Preparation of Dispersing Agent for Suspension Polymerization 2700 g of water and 0.3 g of 2,2-azobis(2-amidinopropane)dihydrochloride were added to a three neck flask with a condenser, and 180 g of the compound of the following Chemical Formula 1 (62.1 wt % of solid content), 40 g of the compound of the Chemical Formula 2 (13.8 wt % of solid content), and 70 g of methyl methacrylate (25 wt % of solid content) were added thereto under nitrogen atmosphere, and the reaction was carried out at 60° C. for 6 hours to obtain an aqueous polymer solution having a solid content of 5 wt %. The weight average molecular weight of the prepared dispersing agent was 2,000,000 g/mol:

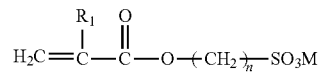

[Chemical Formula 1]

wherein $R_1$ is methyl; n is 1; and M is sodium,

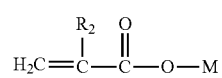

[Chemical Formula 2]

wherein $R_2$ is methyl; and M is potassium.

[Preparation Example 2] Preparation of Impact Resistant Powder

In stage 1, 1500 g of distilled water was added to a 5 L reactor, nitrogen substitution was performed, and then the temperature was raised to 80° C. 0.002 g of ferrous sulfate, 0.008 g of EDTA.2Na salt and 0.2 g of sodium formaldehyde sulfoxylate were added to a reactor and stirred. A mixed solution of 200 g of methyl methacrylate, 6.0 g of 1,3-butanedioldimethacrylate as a crosslinker, 0.7 g of allyl methacrylate as a grafting agent, 6 g of sodium polyoxyethylene alkylether phosphate as an emulsifier, and 0.5 g of tertiary butyl peroxide as an initiator was dropped thereinto for 2 hours, and then emulsion polymerization was carried out with stirring at 500 rpm at 80° C. for 1 hour. At this time, the average particle size of the obtained glassy seed particles was 180 nm.

In stage 2, subsequent to the glassy seed particles prepared in stage 1, 1.0 g of sodium formaldehyde sulfoxylate was dissolved in 20 g of distilled water, and added to the reactor.

A mixed solution of 250 g of butyl acrylate, 55 g of styrene, 5 g of allyl methacrylate as a grafting agent, 1 g of 1,3-butanedioldimethacrylate as a crosslinker, 1 g of cumene hydroperoxide, and 10 g of sodium polyoxyethylenealkylether phosphate was dropped thereinto for 3 hours, and then polymerization was carried out at 80° C. for 2 hours. At this time, the average particle size of the obtained polymer was 250 nm.

Finally in stage 3, with the temperature maintained at 80° C., 1 g of sodium formaldehyde sulfoxylate was added, and then a mixed solution of 285 g of methyl methacrylate, 15 g of methyl acrylate, 1 g of normaloctylmercaptan, and 0.5 g of tertiary butyl peroxide was dropped thereinto for 2 hours, and then polymerization was carried out at 80° C. for 1 hour. At this time, the average particle size of the impact resistant powder as the final polymer was 280 nm.

Examples 1 to 4

<Preparation of Beads>

To a 5 L reactor, 2000 g of distilled water, 12 g of the suspension polymerization dispersing agent having a solid content of 5 wt %, prepared in Preparation Example 1, and 6 g of sodium sulfate as a dispersing aid were added, and dissolved. Monomers of which the kind and content are as listed in the following [Table 1] were added, and normal octylmercaptan as an initiator and a chain transfer agent was added, and dispersed in an aqueous solution with stirring at 400 rpm, thereby preparing a suspension.

The suspension was polymerized at 80° C. for 1 hour and 20 minutes, and heated to 105° C. to be polymerized for further 30 minutes, and then cooled to 30° C. The beads obtained from the polymerization were washed with distilled water and dehydrated repeatedly, and then dried. The physical properties of the thus-prepared acrylic polymer beads were measured and are shown in the following Table 1.

<Preparation of Dope Solution>

25 wt % of the prepared acrylic polymer beads and 75 wt % of a mixed solvent of methylene chloride and methanol at a weight ratio of 9:1 were mixed, and 3 parts by weight of Tinuvin 918 from Ciba Specialty as a UV absorber, based on 100 parts by weight of the mixed solution, was added, thereby preparing a dope solution. The viscosity of the dope solution was measured and is shown in the following Table 1.

<Preparation of Film>

The dope solution was extruded on the surface of a metal belt at 20° C. using a die, in a sheet form having a thickness of 400 μm and a width of 800 mm. While the metal belt was rotated, the solvent in the casting solution was dried, and peeling off was carried out. The residual solvent amount in the film when peeling off was 2 wt %. After peeling off, the film was stretched 1.5 times in a transverse direction, and dried at 150° C., thereby preparing a film having a total thickness of 40 μm.

The physical properties of the thus-prepared film were measured and are shown in the following Table 1.

Example 5

As the acrylic polymer beads, the beads prepared in Example 1 were used.

<Preparation of Dope Solution>

25 wt % of the acrylic polymer beads prepared in Example 1, 70 wt % of a mixed solvent of methylene chloride and methanol at a weight ratio of 9:1, and 5 wt % of the impact resistant powder prepared in Preparation Example 2 were mixed, and 3 parts by weight of Tinuvin 918 from Ciba Specialty as a UV absorber, based on 100 parts by weight of the mixed solution, was added, thereby preparing a dope solution. The viscosity of the dope solution which was measured after preparation is shown in the following Table 1. The viscosity of the prepared dope solution was measured after 10 hours, and as a result, it was found that the viscosity change rate after 10 hours was 6%.

Film preparation was carried out identically to Example 1, and after preparation of the dope solution, the film was prepared within 10 hours, and the physical properties of the prepared film were measured and are shown in the following Table 1.

Example 6

The dope solution was prepared in the same manner as in Example 5, except that the content of the impact resistant powder was 10 wt %, and the content of the mixed solvent was 65%. The viscosity of the dope solution which was measured after preparation is shown in the following Table 1. The viscosity of the prepared dope solution was measured after 10 hours, and as a result, it was found that the viscosity change rate after 10 hours was 9%.

Film preparation was carried out identically to Example 1, and after preparation of the dope solution, the film was prepared within 10 hours, and the physical properties of the prepared film were measured and are shown in the following Table 1.

Example 7

As the acrylic polymer beads, the beads prepared in Example 2 were used.

<Preparation of Dope Solution>

25 wt % of the acrylic polymer beads prepared in Example 2, 70 wt % of a mixed solvent of methylene chloride and methanol at a weight ratio of 9:1, and 5 wt % of the impact resistant powder prepared in Preparation Example 2 were mixed, and 3 parts by weight of Tinuvin 918 from Ciba Specialty as a UV absorber, based on 100 parts by weight of the mixed solution, was added, thereby preparing a dope solution. The viscosity of the dope solution which was measured after preparation is shown in the following Table 1. The viscosity of the prepared dope solution was measured after 10 hours, and as a result, it was found that the viscosity change rate after 10 hours was 7%.

Film preparation was carried out identically to Example 1, and after preparation of the dope solution, the film was prepared within 10 hours, and the physical properties of the prepared film were measured and are shown in the following Table 1.

Example 8

As the acrylic polymer beads, the beads prepared in Example 3 were used.

<Preparation of Dope Solution>

25 wt % of the acrylic polymer beads prepared in Example 3, 70 wt % of a mixed solvent of methylene chloride and methanol at a weight ratio of 9:1, and 5 wt % of the impact resistant powder prepared in Preparation Example 2 were mixed, and 3 parts by weight of Tinuvin 918 from Ciba Specialty as a UV absorber, based on 100 parts by weight of the mixed solution, was added, thereby preparing a dope solution. The viscosity of the dope solution which was measured after preparation is shown in the following Table 1. The viscosity of the prepared dope solution was measured after 10 hours, and as a result, it was found that the viscosity change rate after 10 hours was 6%.

Film preparation was carried out identically to Example 1, and after preparation of the dope solution, the film was prepared within 10 hours, and the physical properties of the prepared film were measured and are shown in the following Table 1.

Example 9

40 wt % of the acrylic polymer beads prepared in Example 1 and 60 wt % of a mixed solvent of methylene chloride and methanol at a weight ratio of 9:1 were mixed, and 3 parts by weight of Tinuvin 918 from Ciba Specialty as a UV absorber, based on 100 parts by weight of the mixed solution, was added, thereby preparing a dope solution. The viscosity of the dope solution was measured and is shown in the following Table 1. In addition, a film was prepared in the same manner as in Example 1, and the physical properties of the prepared film were measured and are shown in the following Table 1.

Example 10

Beads were prepared in the same manner as in Example 1, except that in Example 4, polyvinyl alcohol was used as a suspension polymerization dispersing agent, and a polymer having a weight average molecular weight of 450,000 g/mol was prepared, as shown in the following Table 1.

The physical properties of the prepared film were measured and are shown in the following Table 1.

Comparative Example 1

25 wt % of cellulose triacetate powder having a substitution degree of 2.87 and 75 wt % of a mixed solvent of methylene chloride and methanol at a weight ratio of 9:1 were mixed, and 3 parts by weight of Tinuvin 918 from Ciba Specialty as a UV absorber, based on 100 parts by weight of the mixed solution, was added, thereby preparing a dope solution. The viscosity of the dope solution was measured and is shown in the following Table 2.

The dope solution was used to prepare a film having a total thickness of 40 μm, in the same manner as in Example 1.

The physical properties of the thus-prepared film were measured and are shown in the following Table 2.

Comparative Example 2

The beads were prepared in the same manner as in Example 1, except that a polymer having a weight average molecular weight of 124,000 g/mol was prepared, as shown in the following Table 2.

Thereafter, the dope solution and the optical film were prepared in the same manner as in Example 1, and the physical properties were measured and represented in the following Table 2.

Comparative Example 3

3 parts by weight of Tinuvin 918 from Ciba Specialty as a UV absorber, based on 100 parts by weight of the beads prepared in Comparative Example 2 was mixed therewith, and kneaded at 260° C. under nitrogen atmosphere using a biaxial extruder, thereby preparing a resin pellet.

The prepared resin pellet was prepared into a 160 μm film using a T-die extruder, and stretched twice in a machine direction and twice in a transverse direction, thereby preparing a film having a thickness of 40 μm.

The physical properties of the thus-prepared film were measured and are shown in the following Table 2.

Comparative Example 4

The beads were prepared in the same manner as in Example 1, except that polyvinyl alcohol was used as a suspension polymerization dispersing agent, and a polymer having a weight average molecular weight of 310,000 g/mol was prepared, as shown in the following Table 2.

The physical properties of the thus-prepared film were measured and are shown in the following Table 2.

Comparative Example 5

The acrylic polymer beads prepared in Example 4 were used. The beads and cellulose ester (cellulose acetate propionate, a substitution degree in an acyl group of 2.75, an acetyl group substitution degree of 0.19, a propionyl group substitution degree of 2.56, a weight average molecular weight of 200000, and a glass transition temperature of 144° C.) were mixed to prepare a dope solution, and the physical properties of the film prepared in the same manner as in Example 4 were measured and are shown in Table 2.

<Preparation of Dope Solution>

25 wt % of a mixed resin of the acrylic polymer beads prepared in Example 4 and the cellulose ester at a weight ratio of 70:30 and 75 wt % of a mixed solvent of methylene chloride and methanol at a weight ratio of 9:1 were mixed, and 3 parts by weight of Tinuvin 918 from Ciba Specialty as a UV absorber, based on 100 parts by weight of the mixed solution, was added, thereby preparing a dope solution. The viscosity of the dope solution was measured and is shown in the following Table 1.

The physical properties of the prepared film were measured and are shown in the following Table 2.

Comparative Example 6

Acrylic polymer beads were prepared in the same manner as in Example 4, except that a content of the monomer and a content the chain transfer agent were added as described in the following Table 2, and a dope solution was prepared. The viscosity of the dope solution was measured and is shown in the following Table 2.

In addition, a film was prepared in the same manner as in Example 4, and the physical properties of the prepared film were measured and are shown in the following Table 2.

Comparative Example 7

Acrylic polymer beads were prepared in the same manner as in Example 4, except that a content of the chain transfer agent was added as described in the following Table 2, and a dope solution was prepared. The viscosity of the dope solution was measured and is shown in the following Table 2.

In addition, a film was prepared in the same manner as in Example 4, and the physical properties of the prepared film were measured and are shown in the following Table 2.

Hereinafter, in Tables 1 and 2, abbreviations are as follows:

MMA: methyl methacrylate
AMS: alphamethylstyrene
PMI: phenylmaleimide
MA: methyl acrylate
n-BMA: n-butyl acrylate
AMPO: Luperox 575, (T-Amyl peroxy 2-ethyl hexanoate)
n-OM: normal octylmercaptan

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Content of monomer (g) | MMA | 930 | 975 | 950 | 950 | 930 | 930 | 975 | 950 | 930 | 950 |
|  | AMS | 20 | — | — | — | 20 | 20 | — | — | 20 | — |
|  | PMI | 50 | — | — | — | 50 | 50 | — | — | 50 | — |
|  | MA | — | 25 | — | — | — | — | 25 | — | — | — |
|  | n-BMA | — | — | 50 | 50 | — | — | — | 50 | — | 50 |
| Initiator (g) | AMPO | 1.2 | 1.2 | 1.2 | 1.2 | 1.2 | 1.2 | 1.2 | 1.2 | 1.2 | 1.2 |
| Chain transfer agent (g) | n-OM | 0.2 | 0.2 | 0.2 | 0.6 | 0.2 | 0.2 | 0.2 | 0.2 | 0.2 | 0.6 |
| Physical properties of beads | $T_g$ (° C.) | 127 | 118 | 114 | 114 | 127 | 127 | 118 | 114 | 127 | 114 |
|  | Mw | 652,000 | 713,000 | 958,000 | 430,000 | 652,000 | 652,000 | 713,000 | 658,000 | 652,000 | 450,000 |
|  | Total residual monomer (ppm) | 3420 | 2910 | 3120 | 3200 | 3420 | 3420 | 2910 | 3120 | 3420 | 3200 |
| Impact resistant powder | wt % in dope solution | — | — | — | — | 5 | 10 | 5 | 5 | — | — |
| Viscosity of dope solution | cps, 25° C. | 32,000 | 36,000 | 38,000 | 24,000 | 32,000 | 37,000 | 36,000 | 32,000 | 60,000 | 21,000 |
| Physical properties of film | Film formation | Possible | Possible | Possible | Possible | Possible | Possible | Possible | Possible | Possible | Possible |
|  | $R_{in}/R_{th}$ (nm) | 0.6/1.1 | 0.5/1.1 | 0.8/1.1 | 0.7/1.3 | 0.6/1.1 | 0.8/1.2 | 0.5/1.2 | 0.8/1.1 | 0.6/1.1 | 0.9/1.1 |
|  | Haze (%) | 0.9 | 1.3 | 1.1 | 1.2 | 1.3 | 1.3 | 1.2 | 1.0 | 1.2 | 2.0 |
|  | Light transmittance (%) | 92.3 | 92.5 | 92.0 | 92.0 | 92.0 | 92.0 | 92.4 | 92.1 | 92.3 | 89.1 |
|  | Tensile strength (GPa) | 2.2 | 2.4 | 2.5 | 2.1 | 2.6 | 2.7 | 2.5 | 2.4 | 2.2 | 1.5 |
|  | Moisture permeability (g/m².24 hr) | 86 | 91 | 96 | 98 | 84 | 86 | 91 | 97 | 86 | 98 |
|  | Adhesion | Good | Good | Good | Good | Good | Good | Good | Good | Good | Normal |
|  | Smoothness | 0.8 | 0.8 | 0.9 | 0.9 | 0.8 | 0.8 | 0.8 | 0.9 | 0.9 | 2.0 |
|  | Foreign substance inspection | 0.1 | 0.1 | 0.1 | 0.1 | 0.1 | 0.1 | 0.1 | 0.1 | 0.1 | 0.6 |
|  | Peeling-off property (2 wt %) | Normal | Normal | Normal | Normal | Excellent | Excellent | Excellent | Excellent | Normal | Bad |
|  | Peeling-off property (50 wt %) | Normal | Normal | Normal | Normal | Excellent | Excellent | Excellent | Excellent | Normal | Bad |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Content of monomer (g) | MMA | — | 930 | 930 | 950 | 950 | 850 | 950 |
|  | AMS | — | 20 | 20 | — | — | — | — |
|  | PMI | — | 50 | 50 | — | — | — | — |
|  | MA | — | — | — | — | — | — | — |
|  | n-BMA | — | — | — | 50 | 50 | 150 | 50 |
| Initiator (g) | AMPO | — | 1.2 | 1.2 | 1.2 | 1.2 | 1.2 | 1.2 |
| Chain transfer agent (g) | n-OM | — | 0.25 | 0.25 | 1.0 | 0.6 | 1.2 | 0.8 |
| Physical properties of beads | $T_g$ (° C.) |  | 125 | 125 | 115 | 114 | 105 | 113 |
|  | Mw | — | 124,000 | 124,000 | 310,000 | 430,000 | 320,000 | 380,000 |
|  | Total residual monomer (ppm) | — | 3300 | 3220 | 3120 | 3200 | 3300 | 3200 |
| Viscosity of dope solution | cps, 25° C. | 37,000 | 1,400 | — | 17,000 | 20,000 | 16,000 | 19,000 |

TABLE 2-continued

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Physical properties of film | Film formation | Possible | Impossible | Possible | Impossible | Possible | Impossible | Impossible |
| | $R_{in}/R_{th}$ (nm) | 1.1/26.2 | — | 0.8/1.1 | — | 3/10.1 | — | — |
| | Haze (%) | 0.5 | — | 1.0 | — | 21.0 | — | — |
| | Light transmittance (%) | 92.0 | — | 92.0 | — | 65.5 | — | — |
| | Tensile strength (GPa) | 4.5 | — | 2.1 | — | 1.7 | — | — |
| | Moisture permeability (g/m².24 hr) | 650 | — | 90 | — | 450 | — | — |
| | Adhesion | Good | — | Normal | — | Normal | — | — |
| | Smoothness | 0.5 | — | 4.0 | — | 3.0 | — | — |
| | Foreign substance inspection | 0.1 | — | 0.4 | — | 1.0 | — | — |
| | Peeling-off property (2 wt %) | Normal | Bad | — | Bad | Normal | — | — |
| | Peeling-off property (50 wt %) | Normal | Bad | — | Bad | Normal | — | — |

As shown in Comparative Example 1 above, it was confirmed that the dope solution prepared in the present invention represented equal or similar optical properties to the conventional cellulose film, and an optical film having lower moisture permeability and an excellent peeling-off property may be prepared.

When a polymer having a weight average molecular weight of 124,000 g/mol was used as shown in Comparative Example 2, and when a polymer having a weight average molecular weight of 310,000 g/mol was used as shown in Comparative Example 4, film rupture occurred when peeling off, so that it was impossible to form a film.

In addition, as shown in Comparative Example 3, it was confirmed that when a film was prepared by melt extrusion using an extruder without preparation of the dope solution, it had reduced adhesion and smoothness as compared with the film prepared by a casting method.

In addition, as shown in Comparative Example 5, it was confirmed that when an acryl polymer and a cellulose acetate resin were mixed to form a film, a haze was 21% which is very high and a light transmittance was 65.5% which is very low, and thus, it is impossible to use the film as an optical film.

When a glass transition temperature was less than 110° C. and a weight average molecular weight was less than 400,000 g/mol as in Comparative Examples 6 and 7, solvent casting of the dope solution was impossible. In addition, even in the case that the solvent casting was possible, thermal resistance durability of the film was deteriorated, and thus, when the film is maintained under a high temperature and high humidity condition such as a post-process for a film, the film is easily deformed to change a phase difference, and accordingly, the film may not be appropriate for being used as a polarizing plate protective film.

The invention claimed is:

1. A dope solution for preparing a polarizing plate protective film, comprising: an acrylic polymer having a weight average molecular weight of 400,000 g/mol or more and a glass transition temperature of 110° C. or more, and an organic solvent,
wherein the acrylic polymer is a copolymer of at least two or more of (A) alkyl methacrylate-based monomer; or a copolymer of at least one or more of (A) alkyl methacrylate-based monomer with any one or two or more monomers selected from the group consisting of (B) alkyl acrylate-based monomer, (C) styrene-based monomer and (D) maleimide-based monomer;
wherein the copolymer is produced by suspension polymerization in a presence of a suspension polymerization dispersing agent, and the suspension polymerization dispersing agent is produced by polymerizing a compound represented by the following Chemical Formula 1, a compound represented by the following Chemical Formula 2, and alkyl(meth)acrylate:

[Chemical Formula 1]

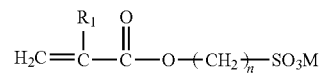

wherein R1 is hydrogen or C1 to C3 alkyl; n is an integer selected from 0 to 3; and M is any one selected from the group consisting of lithium, sodium, potassium and ammonium,

[Chemical Formula 2]

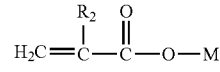

wherein $R_2$ is hydrogen or $C_1$ to $C_3$ alkyl; and M is any one selected from the group consisting of lithium, sodium, potassium and ammonium.

2. The dope solution of claim 1, wherein the acrylic polymer is comprised at a solid content of 10 to 40 wt % in the dope solution, and the dope solution has a viscosity at 25° C. of 20,000 cps or more.

3. The dope solution of claim 1, wherein (A) the alkyl methacrylate-based monomer is any one or a mixture of two or more selected from the group consisting of methyl methacrylate, ethyl methacrylate, isopropyl methacrylate, n-butyl methacrylate, t-butyl methacrylate, cyclohexyl methacrylate, isobornyl methacrylate and hydroxyethyl methacrylate.

4. The dope solution of claim 1, wherein
(B) the alkyl acrylate-based monomer is any one or a mixture of two or more selected from the group consisting of methyl acrylate, ethyl acrylate, isopropyl acrylate, n-butyl acrylate, t-butyl acrylate, cyclohexyl acrylate, isobornyl acrylate and hydroxyethyl acrylate, (C) the styrene-based monomer is any one or a mixture of two or more selected from the group consisting of styrene, α-methyl styrene, p-bromostyrene, p-methylstyrene and p-chlorostyrene, and (D) the maleimide-based monomer is any one or a mixture of two or more selected from the group consisting of phenylmaleimide, nitrophenylmaleimide, monochlorophenylmaleimide, dichlorophenylmaleimide, monomethylphenylmaleimide, dimethylphenylmaleimide, ethylmethylphenylmaleimide and cyclohexylmaleimide.

5. The dope solution of claim 1, wherein the organic solvent is halogenated hydrocarbon alone, or a mixed solvent of halogenated hydrocarbon with any one or two or more selected from the group consisting of ester, ketone, ether and alcohol.

6. The dope solution of claim 5, wherein the organic solvent is a mixed solvent of methylene chloride and alcohol.

7. The dope solution of claim 1, further comprising polycarbonate.

8. The dope solution of claim 1, further comprising two-layered or three-layered impact resistant powder including an acryl rubber layer in a core layer or an intermediate layer.

9. The dope solution of claim 8, wherein the acryl rubber layer is a polymer of an aromatic vinyl-based monomer and an alkyl(meth)acrylate monomer having 1 to 15 carbon atoms.

10. The dope solution of claim 8, wherein the impact resistant powder has an average particle diameter of 100 to 400 nm.

11. The dope solution of claim 8, wherein the impact resistant powder is comprised at a solid content of 1 to 40 wt % in the dope solution.

12. A polarizing plate protective film having a weight average molecular weight of 400,000 g/mol or more, and a glass transition temperature of 110° C. or more, prepared by a solvent casting method, using the dope solution of claim 1.

13. The polarizing plate protective film of claim 12, wherein it has a smoothness of 1.0 or less, and number of foreign substances of 0.3/1 M or less.

14. The polarizing plate protective film of claim 12, wherein it has moisture permeability of 200 g/m$^2$-24 hrs or less in a range of film thickness of 20 to 80 μm.

15. A polarizing plate comprising:
a polarizer; and
the polarizing plate protective film of claim 12 disposed on at least one surface of the polarizer.

16. An image display comprising the polarizing plate of claim 15.

* * * * *